Patented Feb. 25, 1941

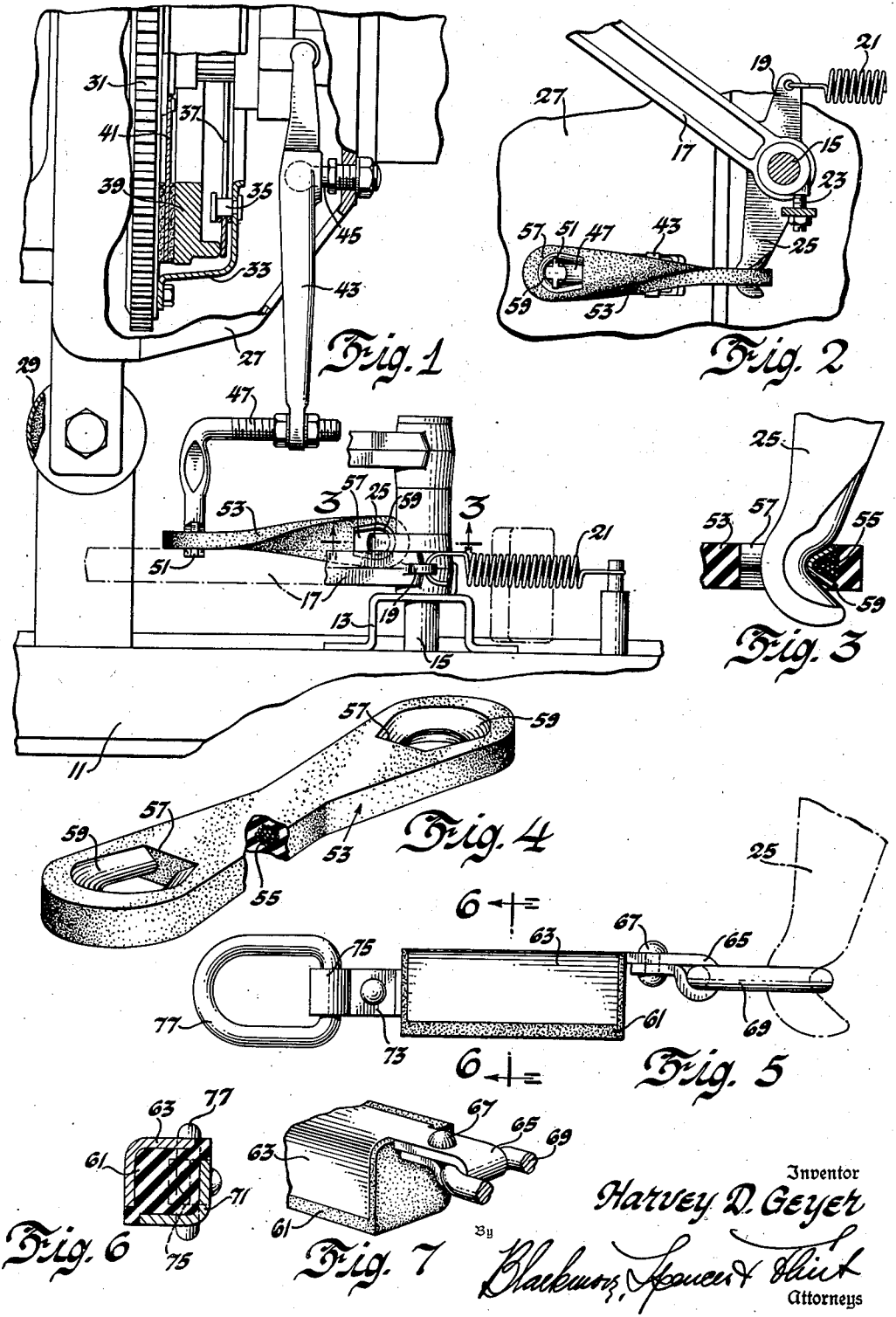

2,232,847

UNITED STATES PATENT OFFICE 2,232,847

FRICTION CLUTCH

Harvey D. Geyer, Dayton, Ohio, assignor to General Motors Corporation, Detroit, Mich., a corporation of Delaware Application March 11, 1939, Serial No. 261,224

2 Claims. (Cl. 192—99)

This invention relates to friction clutches and particularly to the releasing mechanism for such clutches as used in the power transmission line of motor vehicles.

An object of the invention is to so connect the clutch releasing member, which is usually manually operable, with the clutch throwout device so as to prevent the transmission of vibrations of the latter to the former.

Other objects such as efficiency, noiselessness and economy will be understood from the following description.

On the accompanying drawing—

Figure 1 is a top plan view, partly broken away.

Figure 2 is a view in elevation.

Figure 3 is a section on line 3—3 of Figure 1.

Figure 4 is a detail in perspective.

Figure 5 is a view in elevation of a modification.

Figure 6 is a section on line 6—6 of Figure 5.

Figure 7 is a perspective of a part of this modified form.

Referring to the drawing by reference characters, numeral 11 shows a part of the frame of the motor vehicle. To it is secured a bracket 13 cooperating with the frame in the support of a shaft 15 upon which rotates a clutch pedal 17. Pedal 17 has an arm 19 and a return spring 21 which rotates the pedal into contact with an adjustable stop 23. The pedal has a depending arm 25.

The clutch housing 27 has a cushion support at 29 whereby it, together with the engine casing, is supported by the frame in a way to cushion vibrations which would otherwise be transmitted to the frame. In consequence of this cushion support for the engine and clutch housing, some provision should be made in the mechanical connection between the clutch releasing mechanism and the manually operable pedal to prevent vibrations being transmitted to the pedal.

It is unnecessary to describe the clutch details. The drawing shows a ring gear 31 carried by the flywheel, a flywheel cover 33 which anchors at 35 a Belleville clutch spring 37. This spring resiliently moves a pressure plate 39 toward the flywheel to grip the driven plate 41. A throwout lever 43 pivoted at 45 to the clutch housing rotates in a counterclockwise direction as seen in Figure 1 to release the clutch. To properly position the end of lever 43 relative to the pedal arm 25, there is secured to the lever 43 an angular extension 47. The extension 47 has its end 51 longitudinally spaced from arm 25. The lever 43 together with its extension 47 may be referred to as the throwout yoke. It will be understood that this yoke and the end 51 partakes of the movement of the clutch housing while the arm 25 is carried by the vehicle frame relative to which the clutch housing has some degree of movement.

To transmit movement of pedal 17 to lever 43 but to prevent the transmission of the movements of the clutch housing—fore and aft, transverse, and rocking—to the pedal there is provided a connecting link designated as a whole by numeral 53. It is made from rubber reinforced with fabric cords 55. The cords are frictioned with a soft rubber compound and then encased in a covering of soft rubber and cured in a mold. An eye 57 is provided in each end of this rubber link. Each eye is reinforced by a piece of metal 59 resembling a cable thimble. The link is molded flat and is twisted to the extent required when assembled to engage the arm 25 and the end 51 of the yoke. When the link is thus assembled, eye reinforcements preferably fit in notches of the engaging parts as seen in Figure 3. There is sufficient tension imparted to the rubber in the process of assembly to prevent accidental disengagement and no other retaining means is required.

By this simple expedient the pedal is free from movements of the clutch housing which movements are permitted by the cushioned support diagrammatically shown at 29 but all manual effort applied to the pedal is transmitted to the yoke and, through the yoke, is operable to release the clutch.

In a modified form shown in Figure 5 a rubber block rectangular in section is shown at 61. Securely vulcanized to two adjacent sides is an angle metal plate 63. At one end of this angle plate the upper surface has an extension forming a loop 65, the formation being secured by rivets 67. In the loop and also engaging lever arm 25 is a metal ring 69. A second angle plate 71 engages the other pair of adjacent sides as shown in Figure 6 and is vulcanized thereto. Its end extension 73 is formed with a loop 75 and a metal link 77 connects this loop with the end 51 of the throwout yoke. It will be noticed that the planes of the metal links are at right angles to each other whereby the rubber efficiently cushions the rocking motion of the clutch housing. Transverse and longitudinal movements of the clutch housing are accommodated in an obvious manner by the elastic cushion. By this means depression of the pedal serves to release the clutch but vibratory movements of the clutch housing are not transmitted to the pedal.

I claim:

1. In combination with a clutch throwout yoke and a force applying means, connecting means therebetween comprising a rubber link, with fabric cords molded therein, said rubber link being stretched and axially twisted in assembly.

2. In combination with a clutch throwout yoke and a force applying means, connecting means therebetween comprising a rubber link, with fabric cords molded therein, said rubber link having eyes at its ends, said eyes being reinforced with metal thimbles to engage said yoke and said force applying means.

HARVEY D. GEYER.